United States Patent
Furtwangler et al.

(10) Patent No.: US 10,324,691 B2
(45) Date of Patent: *Jun. 18, 2019

(54) FACTORY IDENTIFICATION SYSTEM

(71) Applicant: Home Box Office, Inc., New York, NY (US)

(72) Inventors: Steven N. Furtwangler, Okemos, MI (US); Brandon C. Furtwangler, Issaquah, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/725,446

(22) Filed: Oct. 5, 2017

(65) Prior Publication Data
US 2018/0032315 A1  Feb. 1, 2018

Related U.S. Application Data

(63) Continuation of application No. 14/841,632, filed on Aug. 31, 2015, now Pat. No. 9,792,094.

(60) Provisional application No. 62/046,107, filed on Sep. 4, 2014.

(51) Int. Cl.
| G06F 9/44 | (2018.01) |
| G06F 9/45 | (2006.01) |
| G06F 9/445 | (2018.01) |
| G06F 8/30 | (2018.01) |
| G06F 9/448 | (2018.01) |
| G06F 8/38 | (2018.01) |

(52) U.S. Cl.
CPC ............... *G06F 8/315* (2013.01); *G06F 8/38* (2013.01); *G06F 9/4488* (2018.02); *G06F 9/449* (2018.02)

(58) Field of Classification Search
CPC .......... G06F 8/315; G06F 8/38; G06F 9/4428; G06F 9/443
See application file for complete search history.

(56) References Cited

U.S. PATENT DOCUMENTS

| 5,677,997 A * | 10/1997 | Talatik ...................... G06F 8/10 706/45 |
| 5,787,438 A | 7/1998 | Cink et al. |
| 6,016,514 A * | 1/2000 | Cink ........................ G06F 9/465 719/315 |
| 6,059,838 A * | 5/2000 | Fraley ..................... G06F 9/543 717/108 |

(Continued)

OTHER PUBLICATIONS

Guillaume Chereau Blog, Automatic object factory in C++, Jul. 15, 2014, pp. 1-6 (Year: 2014).*

(Continued)

*Primary Examiner* — Mongbao Nguyen
(74) *Attorney, Agent, or Firm* — Amin, Turocy & Watson, LLP

(57) ABSTRACT

The described technology is directed towards a factory identification system, in which a factory object is provided with a factory identifier (ID) that specifies information regarding a desired object that is more specific than specifying an interface. Additional construction parameters such as an object ID may be provided to further describe the desired object. Also described are object caching and reuse, and tagging the object with information that may be preserved and later used to recreate an object.

17 Claims, 11 Drawing Sheets

(56) References Cited

U.S. PATENT DOCUMENTS

| | | | |
|---|---|---|---|
| 6,240,466 B1 | 5/2001 | McKeehan et al. | |
| 6,496,202 B1* | 12/2002 | Prinzing | G06F 8/38 715/762 |
| 6,615,199 B1* | 9/2003 | Bowman-Amuah | G06F 9/443 706/50 |
| 6,778,990 B2* | 8/2004 | Garcia | G06F 9/4428 707/954 |
| 6,996,800 B2* | 2/2006 | Lucassen | G06F 8/38 717/104 |
| 7,318,225 B1* | 1/2008 | Sorar | H04B 1/0003 717/106 |
| 7,350,197 B2 | 3/2008 | Savov | |
| 7,650,572 B2 | 1/2010 | Olander et al. | |
| 7,664,788 B2* | 2/2010 | Aust | G06F 17/30067 707/620 |
| 8,352,912 B2 | 1/2013 | Bhatkhande et al. | |
| 8,650,156 B1* | 2/2014 | McHugh | G06F 17/30194 707/638 |
| 8,752,066 B2* | 6/2014 | Lipasek | G06F 9/541 719/313 |
| 9,317,470 B1* | 4/2016 | Raley | G06F 15/167 |
| 2002/0184612 A1* | 12/2002 | Hunt | G06F 9/4428 717/116 |
| 2003/0023953 A1* | 1/2003 | Lucassen | G06F 8/38 717/106 |
| 2003/0056195 A1 | 3/2003 | Hunt | |
| 2004/0034859 A1 | 2/2004 | Potter et al. | |
| 2005/0044540 A1 | 2/2005 | Savov | |
| 2005/0055398 A1* | 3/2005 | Olson | G06F 9/541 709/200 |
| 2006/0059107 A1* | 3/2006 | Elmore | G06Q 10/06 705/64 |
| 2007/0240154 A1* | 10/2007 | Gerzymisch | G06F 8/61 717/174 |
| 2008/0022267 A1 | 1/2008 | Johnson, Jr. et al. | |
| 2009/0100406 A1 | 4/2009 | Greenfiled et al. | |
| 2009/0138621 A1* | 5/2009 | Hackmann | G06Q 10/06 710/5 |
| 2009/0327922 A1* | 12/2009 | Van Ness | G06F 8/24 715/760 |
| 2010/0023919 A1 | 1/2010 | Chaar et al. | |
| 2010/0083219 A1 | 4/2010 | Tavares et al. | |
| 2010/0175044 A1 | 7/2010 | Doddavula et al. | |
| 2010/0257509 A1* | 10/2010 | Resnik | G05B 19/0421 717/114 |
| 2011/0078178 A1 | 3/2011 | Ehben | |
| 2011/0082996 A1 | 4/2011 | Waster et al. | |
| 2011/0283269 A1* | 11/2011 | Gass | G06F 8/65 717/168 |
| 2011/0289479 A1 | 11/2011 | Pletter et al. | |
| 2011/0296391 A1* | 12/2011 | Gass | G06F 8/36 717/168 |
| 2012/0072449 A1 | 3/2012 | Patch et al. | |
| 2015/0082279 A1 | 3/2015 | Jakobs et al. | |
| 2015/0199184 A1* | 7/2015 | Doddavula | G06F 8/38 717/104 |
| 2015/0301837 A1* | 10/2015 | Goetz | G06F 9/4428 717/148 |

OTHER PUBLICATIONS

Ben Foster, Using the View Factory Pattern in ASP. NET MVC, 2012, pp. 1-8. (Year: 2012).*

Michael Erdmann, A Framework for Object Persistency for GNAT, 2003, pp. 1-10. (Year: 2003).*

Guy Peleg, Suscribing Template Classes with Object Factories in C++, 2007, pp. 1-13. (Year: 2007).*

Yuan Zhang, Research on CGF Entity Model Based on Factory Mechanism, 2008, pp. 448-451. https://ieeexplore.ieee.org/stamp/stamp.jsp?tp&arnumber=4722090 (Year: 2008).*

IEEE, IEEE Standard for Utility Industry Metering Communication Protocol Application Layer (End Device Data Tables), 2012, pp. 29-41. https://ieeexplore.ieee.org/stamp/stamp.jsp?tp=&arnumber=6264065 (Year: 2012).*

Jenkov.com, Is Dependency Injection Replacing the Factory Patterns, 2014, pp. 1-6. http://tutorials.jenkov.com/dependency-injection/dependency-injection-replacing-factory-patterns.html (Year: 2014).*

SAP, Factory-Pattern in ABAP OO, 2012, p. 1. https://blogs.sap.com/2012/02/20/factory-pattern-in-abap-oo/ (Year: 2012).*

International Search Report and Written opinion from International Patent Application Serial No. PCT/US15/047915, dated Dec. 7, 2015, 14 pages.

Michael Erdmann, User's Guide: A Framework for Object Persistency for GNAT; Version 0.6.1; Document Revision, Revision: 1.17, Chapter 3. ODB Basics, 2003, pp. 1-5.

Guy Peleg, Artima developer Best practice in enterprise software development, Subscribing Template Classes with Object Factories in C++, 2007, pp. 1-13.

Ben Foster, Aspriring entrepreneur, developer and founder of Fabrik, London, UK, Using the View Factory Pattern in ASP.NET MVC, 2012, 7 pages.

Office Action for U.S. Appl. No. 14/841,632 dated Dec. 19, 2016, 46 pages.

Joshua Bloch, Creating and Destroying Java Objects, 2008, pp. 1-14.

Guillaume Chereau Blog, Automatic object factory in C++, 2014, 1 page.

org.apache.commons.mapper.util, Class ObjectFactory, 2010, pp. 1-4.

Notice of Allowance for U.S. Appl. No. 14/841,632 dated Jun. 8, 2017, 46 pages.

* cited by examiner

FACTORY IDENTIFICATION SYSTEM

CROSS-REFERENCE TO RELATED APPLICATION

This application is a continuation of, and claims priority to each of, U.S. patent application Ser. No. 14/841,632, entitled "FACTORY IDENTIFICATION SYSTEM," filed on Aug. 31, 2015, which claims priority to U.S. Provisional Patent Application Ser. No. 62/046,107, entitled "FACTORY IDENTIFICATION SYSTEM," filed Sep. 4, 2014. The entireties of the foregoing applications listed herein are hereby incorporated by reference.

BACKGROUND

In object-oriented programming (OOP), a factory is an object used to create other objects. An object is typically created by specifying an interface to the factory rather than the concrete class that implements that interface. This provides an abstraction that allows the creation of objects without specifying the exact class of object that is to be created. A similar concept exists in prototype-based programming such as JavaScript®, in which a factory provides an abstraction of a prototype object.

This factory pattern is relatively inflexible, and often results in the creation of a number of redundant interfaces.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards a factory that creates objects based upon a factory identifier (ID). One or more aspects are directed towards a request including a factory ID received at a factory object, and using the factory ID to differentiate among different objects that are returnable. An instance of the object may be created based upon the factory ID, and returned in response to the request. A request for an object also may specify additional construction parameter data, such as an object ID that specifies a particular type of object to return given the provided factory ID.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Described herein is a technology that allows program (e.g., application) code to request an object instance via a factory identifier (ID), also referred to as a "factoryId"). The request also may include one or more other creation parameters. Factories as described herein are configured by configuration scripts, which tie classes (or prototypes) to factory IDs, rather than interfaces.

As one example, consider a technology in which an object represents a menu location (which may be visualized as a View object). Menus typically implement a single interface, however there are various implementations of menus (e.g., a navigation menu, settings menu, series menu and so forth), and thus a conventional factory pattern that operates by merely specifying the "menu" interface is inadequate.

The technology described herein instead provides a factory that (for example) is configured with factory IDs representing different kinds of objects, e.g., menus ("NavigationMenu", "SettingsMenu", "SeriesMenu" and so forth). Thus, rather than being limited to a single menu object when program code asks for a menu, the program code provides a corresponding factory ID as a parameter and gets back the desired menu view object.

The technology described herein thus provides a useful variation of the traditional factory pattern for the creation of many of its objects. This allows for more flexibility in describing the object wanted back from a factory without having to create a number of redundant interfaces, while still maintaining a separation between the code using the factory and the details of the implementation.

It should be understood that any of the examples herein are non-limiting. For example, only certain types of factories and objects are exemplified herein, including location factories and objects, view factories and objects, data model factories and objects, and so forth, however these are only non-limiting examples and numerous other types of objects are feasible. As such, the present technology is not limited to any particular implementations, embodiments, aspects, concepts, structures, functionalities or examples described herein. Rather, any of the implementations, embodiments, aspects, concepts, structures, functionalities or examples described herein are non-limiting, and the present technology may be used in various ways that provide benefits and advantages in computing and object-oriented concepts in general.

Figure 1:
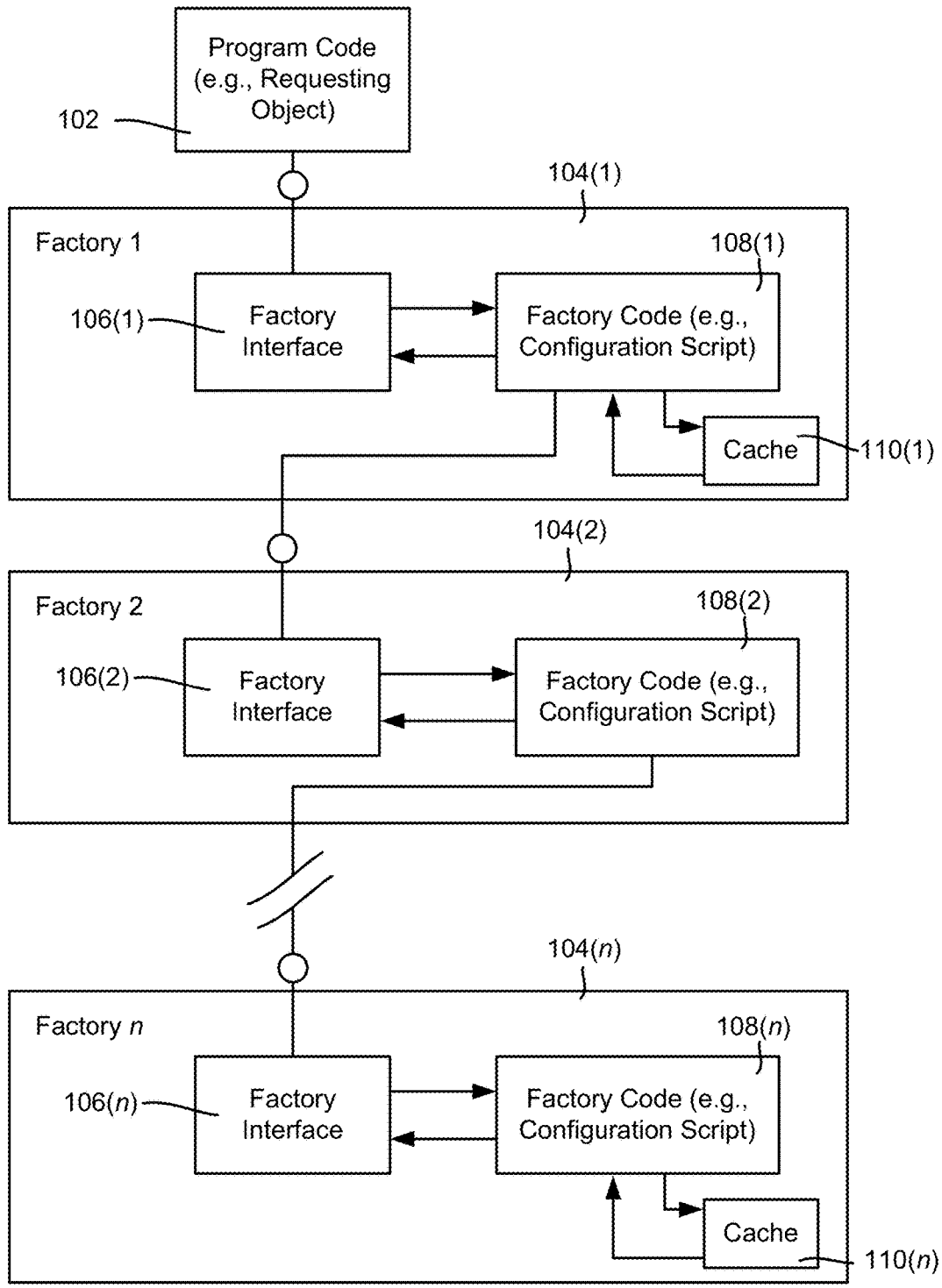
FIG. 1 is a block diagram showing example components that may be used for a factory identification system, according to one or more example implementations.

Factory identification technology may be implemented in various ways, including the example of FIG. 1. For example, consider that from the perspective of some calling code 102, a factory object 104(1) may be called via an interface 106(1) with an object creation request that specifies a factory ID, and any other appropriate construction parameter or parameters as described below. The actual factory object that creates an object may be called indirectly, e.g., program code may call a navigator object (or set of objects) asking to navigate to a location corresponding to a factory ID, with the navigator in turn calling a Location factory object with the factory ID. Moreover, as shown in FIG. 1, any factory object 104(1) may be configured to call another factory 104(2)-104(n) and so on, e.g., hierarchically or otherwise.

Note that for a given factory instance, a different configuration script (e.g., 108(2), which may represent different configuration scripts such as 108(2a), 108(2b) and so on), may be used for the same request, in which the current platform may be used as the basis for which configuration script of a factory is loaded and used, for example. By way of example, consider that a view representing a button is requested. If the platform is a browser, then a corresponding configuration script 108(2a) may be one that uses HTML to specify a button, for example. In a different platform such as a gaming/entertainment console, a different configuration script 108(2b) may be used to create and return the requested button. Similarly a mobile device platform may have a different configuration script 108(2c) loaded for the same button creation purposes. From the perspective of the calling code 102, nothing changes, whereby substantially the same calling code can be used with different platforms, which is another significant benefit of a factory identification system.

Note that there may be a one-to-one mapping between objects (classes) and factory IDs. Notwithstanding, in other situations, there may not be a one-to-one mapping. By way of example, consider that the root menu (e.g., a "home page" or startup menu) in an application program is a navigation menu comprising buttons representing a set of other locations such as submenus to which a user can navigate. In this situation, the factory may be configured to return a NavigationMenu whenever code asks for "RootMenu" even though there may not be a RootMenu class. The same factory also may return a NavigationMenu whenever asked for a "StartupMenu"—that is, more than one factory ID may be used to return an object instance of the same type. Alternatively, the same factory ID may be used to produce multiple instances; there thus may be a one-to-one mapping between objects (classes) and factory IDs, a many-to-one mapping, or a one-to-many mapping.

Figure 2:
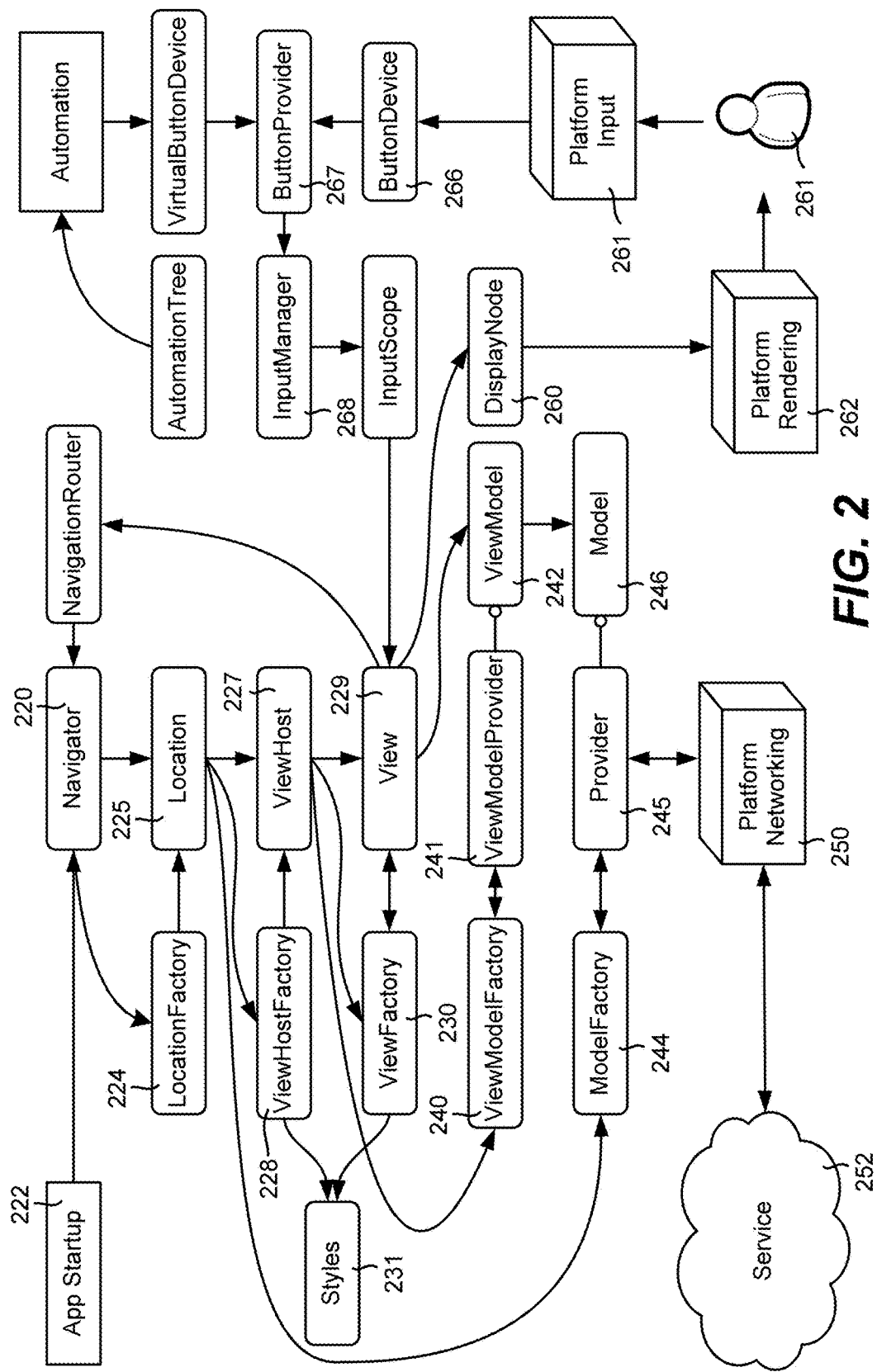
FIG. 2 is a block diagram showing an example configuration of factories and objects that may be used for a user interface of a program, according to one or more example implementations

Turning to a more particular example, in FIG. 2, a navigator object 220 is called by the application startup code 222 to navigate to a root menu (visualized as a View object) corresponding to the startup location, e.g., "RootMenu" is specified as the factory ID. To obtain this menu, the navigator 220 calls a location factory 224 for this location 225. A view host 227 is created via a ViewHostFactory 228 (called by the location 225) for hosting a view menu 229, in which the view menu 229 in turn is created by a ViewFactory 230. Thus, the view host 227 calls the view factory 230 to return the requested view 229, typically applying a style to the view (e.g., color scheme, text size, animation and so forth) as specified by a designer of the view 229 from among a set of styles 231. The view host 227, if visualized, also may have a style applied thereto. Styles are used by the view factory 230 to initialize the created objects' properties. The styles are associated with a factoryId, and can be configured per-client.

Still further, the view 229 may need view-related data, which in turn may be dependent on data of a (data) model. Thus, a view model factory 240, view model provider 241 and view model 242 may be objects called by other objects of the system as represented in FIG. 2; (in general, a provider is an object that knows how to retrieve information corresponding to a model.) Similarly, a (data) model factory 244 that creates a (data) provider 245 that retrieves the needed (data) model 246, e.g., from platform networking 250 that communicates with one or more service(s) 252. For example, the root menu view may contain other views, each comprising a button or other interactive component that when selected takes the user to a different menu, for example. Each of those other buttons (views) may have an associated data model that specifies a navigation location to which the system navigates if that button is pressed.

To summarize the example factories of FIG. 2, to navigate to a location, a location factory 224 maps the name of a navigable location into a concrete type of location 225. The location factory 2242 allows each client (a program/platform using the factory system) to be configured to have different concrete locations.

The view host factory 228 is responsible for creating a view host 227 from a view host factoryId, and applying an appropriate view host style. For a given location, there can be multiple view hosts, e.g., because although different clients may share the same location/data (location), they may look different visually (e.g., a ten foot design versus a tablet design are typically different from each other). Further, for a single client, certain runtime conditions may dictate different views of the same location (e.g., Snap mode vs. Full mode vs. Fill mode are possible conditions that determine how a view appears).

The view factory 230 is responsible for creating a view 229 from a view factoryId, and applying an appropriate view style. Note that one difference between a factoryId and a view type is that a single type (e.g., an ItemsView container object) can be used by multiple factoryId configurations, e.g., a list container can contain different menus each having a different factoryId, for example. A difference between a factoryId and an instance is that the system can stamp out multiple instances for the same factoryId. View factory configurations are basically prefabricated configurations of views.

The view model factory 240 is responsible for creating an instance of a view model provider 241 (which implements a view model interface) for a factoryId, given a model. The view model factory 240 decides which implementation of a view model interface to use (which view model provider 241).

The (data) model factory 244 is responsible for creating an instance of a provider 245 (which implements a Model interface) for a factoryId, given a data ID. The model factory 244 decides which implementation of a view model interface to use (which view model provider 245). For example, a provider object knows how to retrieve its requested data from a network service.

In this way, a container view such as a menu containing buttons that when selected navigate to other locations is built with child views (such as its buttons or tiles), in which each view becomes a display node 260 in a display node tree. The tree is rendered to a user 261 (via platform rendering 262), whereby the user can interact with the view 229 via platform input 264, e.g., to a button device/button provider 266, 267 that is handled by an input manager 268. Interaction with the view 229 results in a navigation router 221 being invoked to navigate to a new location, e.g., another menu comprising a container view with a set of child views with which the user may interact, and so on.

To summarize by returning to the previous example, the application program code may ask for a "RootMenu" and get back an object that implements the menu interface. Although this object is a NavigationMenu, the code using the object only needs to know about the menu interface and the factory ID.

Thus, a single factory ID may be used to obtain a desired view, which is programmed to obtain any child views, for example. From the perspective of the calling code, the complexity of calling multiple factories to build the view's components, apply a style, retrieve the relevant data and so forth is hidden.

Figure 3:
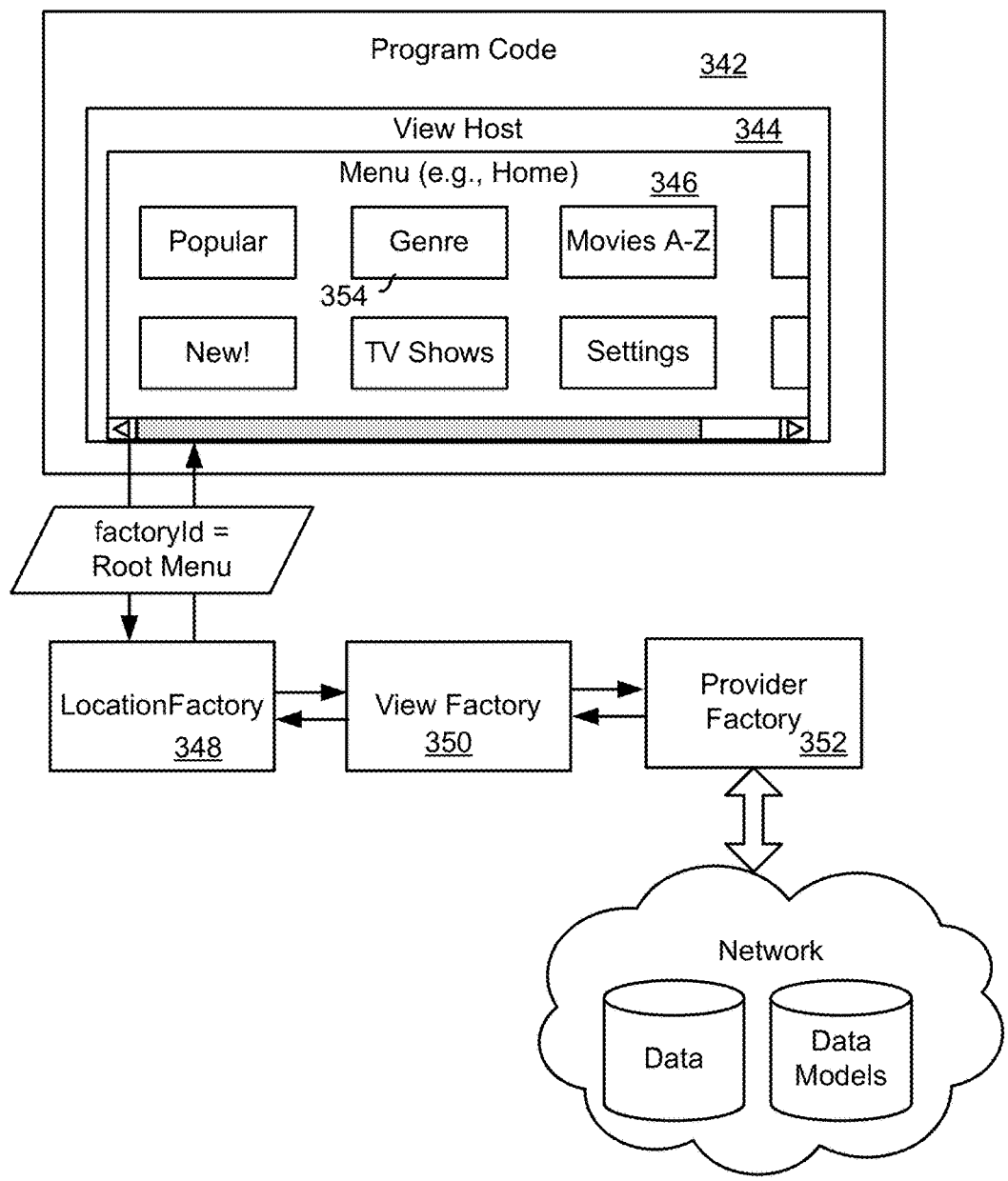
FIGS. 3-5 are representations of menus (view objects) containing child view objects for interaction therewith, in which user (or automated) interaction changes the view from FIG. 3 to FIG. 4 and from FIG. 4 to FIG. 5, according to one or more example implementations.

As described above, based upon user interaction with a menu button/tile and so forth, the navigation router/navigator repeats the process for the user's newly selected location. By way of example, consider that in FIG. 3, program code 342 requests a location (e.g., via navigation) comprising the root menu, resulting in a view host 344 hosting the home menu 346. Note that in this example, a location factory 348 and view factory 350 are shown, however not all of the factories that may be involved are shown, e.g., the view host factory is omitted for clarity, and a single provider factory 352 is represented.

When rendered, the root (home) menu 346 provides various options that are each child views such as a button or a tile. If the user selects a "Genre" button 354 from this menu 330, a new location (e.g., a Genre menu) is provided to the navigation system, which calls the location factory with a request for the Genre menu (via a factory ID for the Genre menu as a parameter, e.g., 'GenreMenu').

Figure 4:
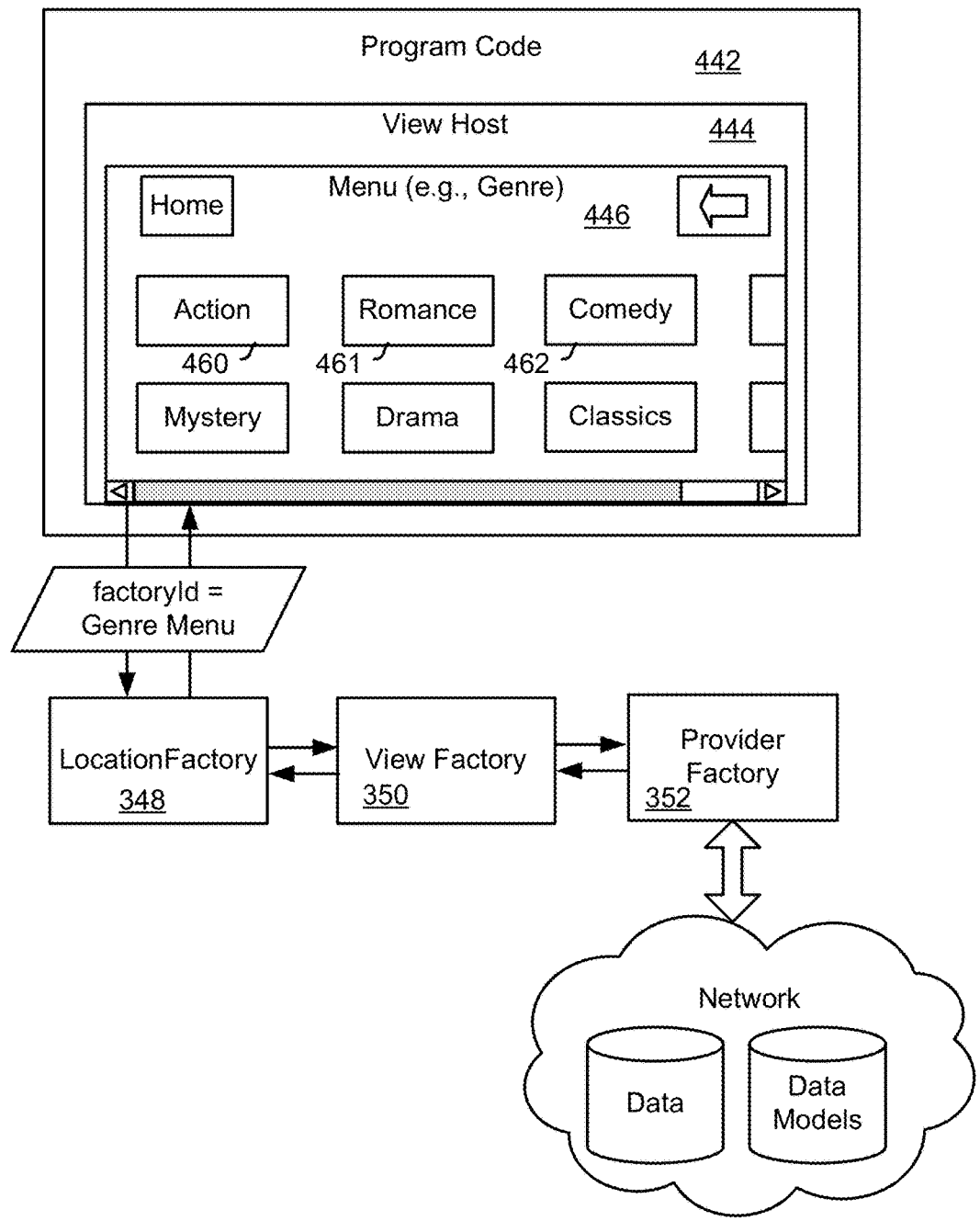

As shown in FIG. 4, this Genre menu 446 may, for example, have buttons for the various genres that are available, e.g., one button 460 for action movies, another button 461 for romance movies, another button 462 for comedy movies and so on. Consider that further user interaction selects "Action" movies as the user-desired genre in this example.

In this example, each of the various different genre menus may be the same in appearance, except for the list (e.g., FIG. 5) or grid of tiles that each different genre menu shows, with each tile representing a movie in the relevant genre category. Instead of having a factory ID for each similarly appearing genre menu, a parameter specifying the type of genre may be used when calling the genre menu (view) factory. In one or more implementations, the parameter comprises an object ID.

When creating an object set (comprising one or more objects), the identification-based factory described herein is configured to take a number of one or more parameters, which are used to construct the object or objects in need. Because the code using the factory knows the kind of object (that is, the interface) but not the specific class, an additional parameter is used when objects of a certain kind take the same factory ID arguments. In the more particular example, code may basically specify something like "give back a menu with factory ID 'GenreMenu' and parameter of 'Action'". Here, the code developer may not know exactly how GenreMenus are implemented, but does know that GenreMenus can be initialized with a parameter specifying which genre the menu is to display. This 'Action' parameter is referred to as the object ID, because it can uniquely identify the object from others of its type, e.g., there may be a factory ID 'GenreMenu' with a different object ID of 'Comedy', another with another object ID of 'Romance' and so on.

Figure 5:
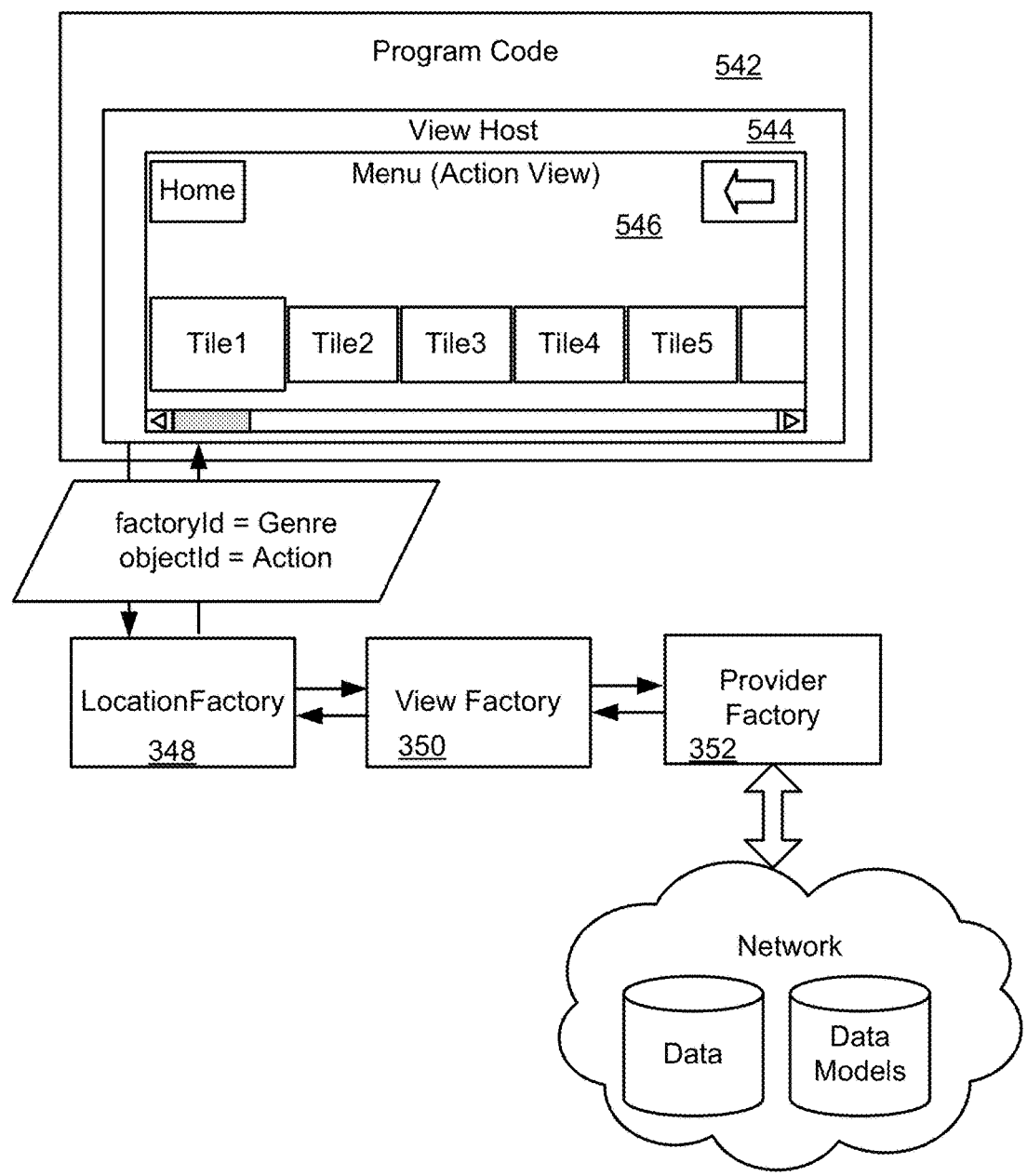

Thus, as exemplified in FIG. 5, when the view factory is called with a factory ID of 'Genre' and an object ID of 'Action' the view factory knows to call the view model factory and/or data model factory for the Action category tiles. The caller, by asking for the Genre/Action menu 546, gets back tiles (Tile 1-Tile 5 and beyond are shown), each tile populated with a movie of the Action category, wherein a tile may be composed of an image, rating and movie title, for example; (note that not all action movies need have a representative tile at this time, which may be created and/or retrieved on demand when needed, e.g., new tiles may be virtualized as needed as the user scrolls further into the view).

Moreover, other parameters may be used. Consider for example that a user selects an accessibility option that increases text size, and/or changes the color scheme. A factory ID 'GenreMenu' with an object ID of 'Comedy' and an accessibility scheme 'On' parameter may be used by the system so as to select a different style (from the default style) for a GenreMenu/Comedy whenever the accessibility scheme parameter is specified as on. Alternatively, a global parameter may be set for the factories, e.g., accessibility is turned on or off for all relevant view objects.

As can be readily appreciated, it is alternatively feasible to use a factory ID for each genre category, e.g., a factoryId of 'GenreAction', another of 'GenreRomance' and so on. However in this example because of the similarity between the different genre menus, (only the presented subset of movie tile views differ among each Genre view), it is likely more practical to use object IDs as differentiation parameters. A system designer can determine which views only need a factory ID, and which views need a factory ID and additional parameter data.

As can be seen, the code that ultimately uses the factory or factories does not need to know about the specific classes that implement the menu interface or when to use which of them. Instead, the code only needs to know about one or more factory IDs, and any relevant parameter data such as the object IDs for those factory IDs needing more information.

Returning to FIG. 1, some of the factories may use a cache (e.g., 110(*n*)) so as to avoid recreating an object that already exists. For example, consider that the data for an object is read only. In the example in which the genre menu for action movies is viewed, and another menu (e.g., "popular" movies) both contain the same movie, the (data) model factory need not create and cause the same data object to be retrieved from the network multiple times, e.g., if the user switches from the action genre movie menu to the popular movies menu. A cache may be used whenever an object instance can be reused (rather than needing separate instances of an object).

A cache may be kept (or not) at each factory level. Thus, for example, a view may be cached by the view factory for any views that can be copies of the same instance, and a data model by the data factory. The caches need not be the same sizes.

A factory's cache may use any cache-related management techniques, such as expiration times, and retention policies. For example, least frequently used or least recently used objects may be removed from the cache as more space is needed. The policy may be different at different levels, e.g., a view factory may discard its least recently used items to make room for a new item, whereas the (data) model factory may discard its least frequently used items (or vice-versa). Some coordination between caches is feasible, e.g., a cache manager or the like can determine that the data cache contains the data for a view, whereby the view can be discarded from the view cache, or a reference to the data may be kept in the view (instead of the redundant data itself) so as to save space.

Thus, one or more aspects are directed towards a cache, which allows reusing objects rather than creating new ones every time one is needed. Note that this is not desired behavior for all objects, so caching is not used by every factory.

The (data) model factory, for example, makes use of caching. As set forth above, a Model is an object that represents some data. One example is a Model that represents a movie, such as a tile that may be rendered on the screen with which the user may interact to select that movie, e.g., for playback or to learn more about the movie (e.g., read about the cast and crew). The same movie may be represented on multiple Views, such as an interactive list or grid (container) menu view for currently 'Popular' movies, and an interactive list or grid (container) menu view for 'Romance' genre movies. Thus, in the above example at least two different container Views need data from the same model (with the same factory ID and object ID).

Figure 6:
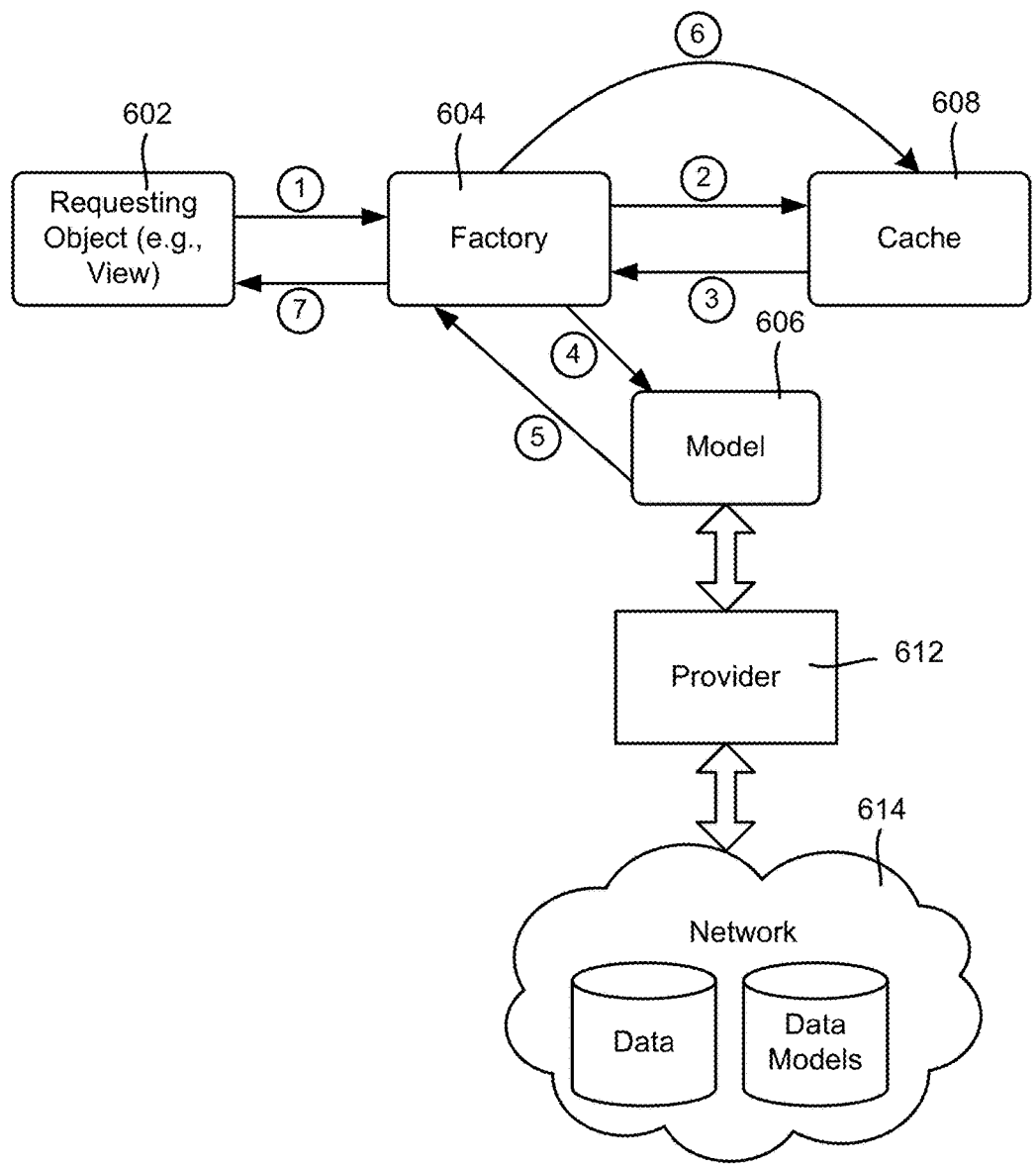
FIG. 6 is representation of a factory creating and returning an object when a data model needed for the object is not found in a cache, according to one or more example implementations.

FIG. 6 exemplifies a first request, in which the labeled arrows correspond to the below ordering of handling the request:
1. A view 602 asks the Factory 604 for a Model 606 with some Factory ID and Object ID
2. The Factory 604 asks the Cache 608 if such an object already exists
3. The Cache 608 returns that no such object exists in the cache
4. The Factory 604 then creates a new instance of the Model 606 using the function that was configured to that factory ID, e.g., via a provider 612 that accesses the data in the network 614
5. An instance of the model 606 is returned to the Factory 604
6. The Factory 604 puts the Model 606 into the Cache 608
7. The Factory 604 returns the requested Model 606 to the View 602.

Figure 7:
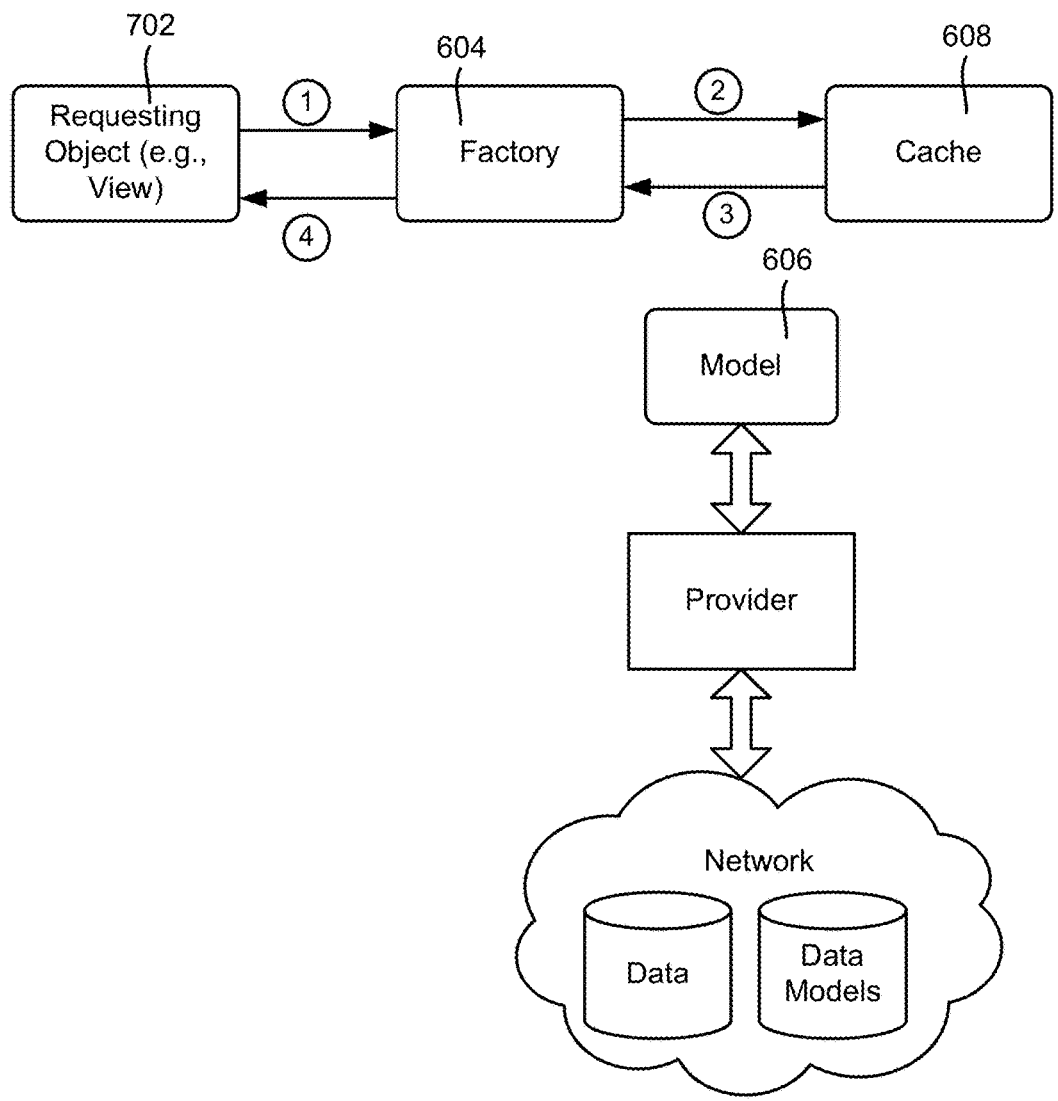
FIG. 7 is representation of a factory returning an object when a data model needed for the object is found in a cache, according to one or more example implementations.

FIG. 7 exemplifies subsequent requests, in which the labeled arrows again correspond to the below ordering of handling the request:
1. A view 702 asks the Factory 604 for a Model 606 with the same Factory ID and Object ID
2. The Factory 604 asks the Cache 608 if such an object already exists
3. The Cache 608 finds the object and returns the existing instance of the Model 606
4. The Factory 604 returns the requested Model 608 to the View 702.

Thus, by way of a more particular example, consider that the 'Popular' movie view menu first asks the ModelFactory for a Model with a particular factory ID and object ID. During this first call, the factory fails to find such an object in the cache, so the factory creates a new Model object, stores it in the cache, and returns an instance of the Model object. When a second 'Romance' view menu requests the same Model using the factory ID and object ID, the factory finds the Model object in the cache and returns the same instance rather than creating a new one. Because Models are generally read-only in one implementation and have to do some work to resolve their data, (e.g., retrieve an image for the tile and other data from the network), it is advantageous to reuse Models when possible rather than creating another Model that otherwise has to redo the same work to return the same data.

Turning to another aspect, objects returned by the factory are tagged with the factoryID used to create them. This may be used in conjunction with any other parameters used to construct an object to recreate that object, including by some calling code that did not create the object in the first place (and so needs to know what factory ID to use to recreate it).

Figure 8A:
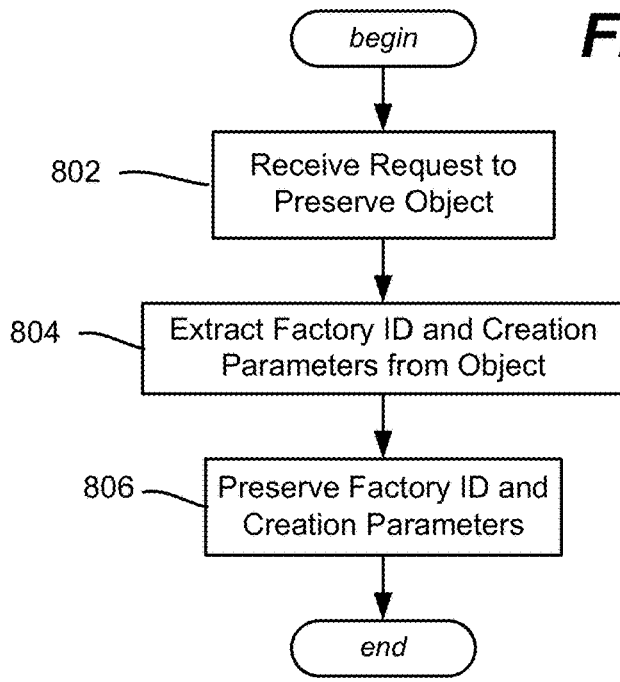
FIG. 8A is a flow diagram showing example steps that may be taken to preserve information regarding an object, including the factory ID and any other object construction-related information, according to one or more example implementations.

By way of example, consider that some portion of code is responsible for preserving an object (or set of objects) that are currently in use. This may be done, for example, so that the user can resume a program substantially as if the user never stopped, paused or took another action. As shown in FIG. 8A, rather than serialize each entire object, for each request (step 802), the responsible code instead extracts from the object the tagged factory ID and any construction parameter(s) that were used (step 804), and preserves the factory ID and any such parameters that were used to create the object (step 806).

Figure 8B:
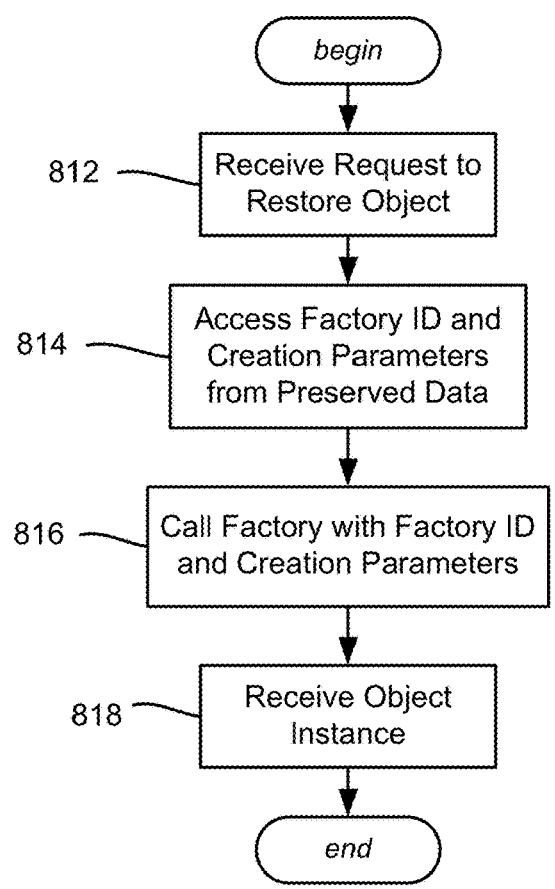
FIG. 8B is a flow diagram showing example steps that may be taken to restore an object using the information preserved via FIG. 8A, according to one or more example implementations.

Then, when that object is later needed, such as upon resuming the application program, the factory is contacted using the preserved factory ID and other parameter information to get the object back. This is because in one or more implementations, if the factory is asked for an object with FactoryID X and construction parameter set Y, the requestor will get back the same object (whether a cached instance or a new instance of the same object) that the system had when preserved. This is represented in FIG. 8B, where a request to restore the object is received (step 812), and the preserved factory ID and parameters are used (step 814) to call the factory (step 816). The object instance is returned at step 818, again without having to have serialized and de-serialized the entire object's data.

Note that in certain situations, it is feasible that some information in the object is not exactly the same if recreated at a later time. By way of example, consider that a data model object has some information therein that is relevant at time A. Sometime later, the information is changed, e.g., because of an update to the information. If a user took an action that caused the factory ID and parameters to be preserved after time A, and at some later time B takes another action that causes the restoring the object, the updated information is present in a new instance, (but updated information is not present if a cached instance still exists and has not expired). It is feasible for program code to set a flag or the like to indicate to the factory to create a new instance rather than use a cached instance so that any updates are present in a restored object.

Figure 9:
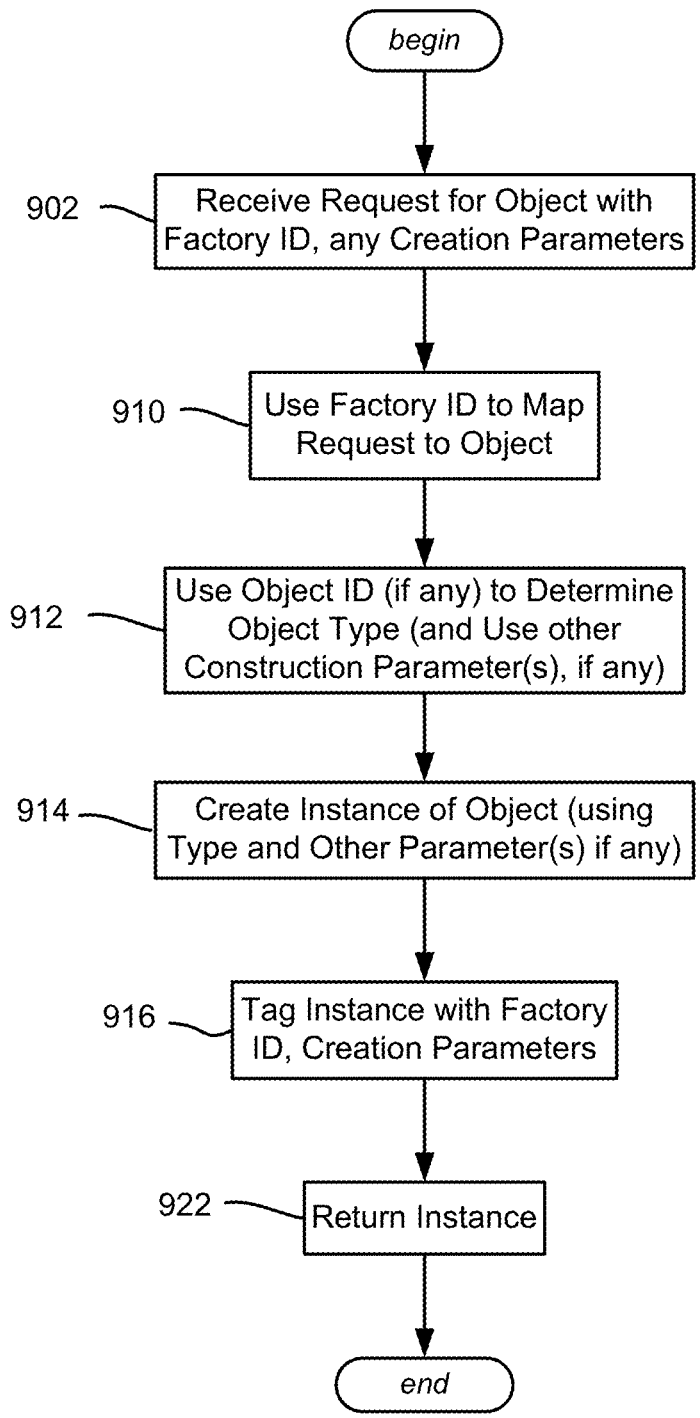
FIG. 9 is a flow diagram showing example steps that may be taken by a factory to create and return a requested object instance, when the factory does not have a cache, according to one or more example implementations.

FIG. 9 is a flow diagram containing example steps that summarize the general operation of a factory that does not have a cache, beginning at step 902 where a request for an object is received. As is understood, the request includes a factoryId, as well as any other needed (or optional) creation parameters.

Step 910 represents mapping the factory ID to a relevant object, e.g., the root menu, a settings menu, a genre menu and so on. Step 912 represents using any parameter(s), e.g., the object ID to determine the object type such as genre menu of type 'Action' to create the instance of the object (step 914). Step 916 tags the instance with the factory ID and any other data corresponding to any construction parameter set. Step 922 returns the requested instance to the caller.

Figure 10:
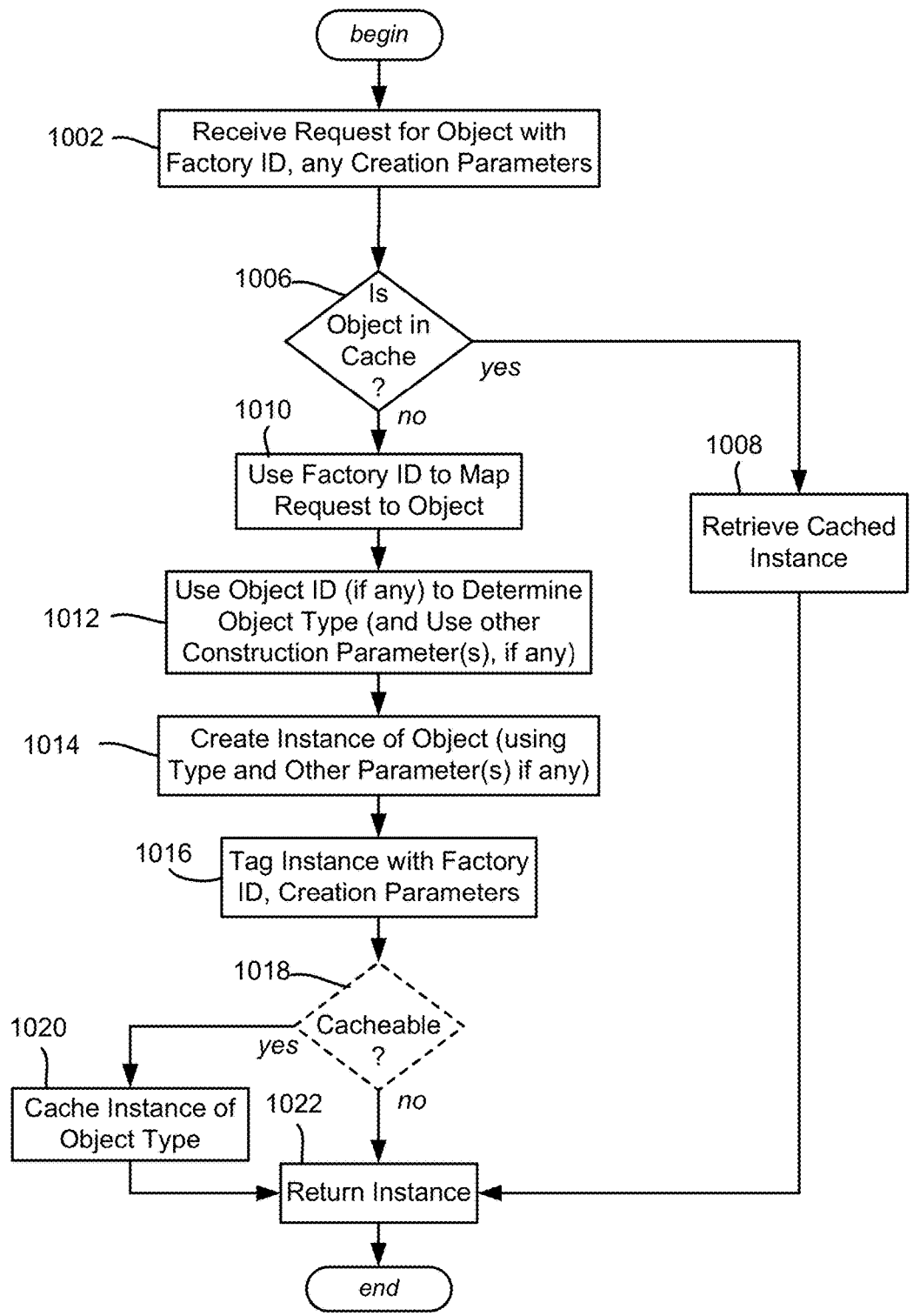
FIG. 10 is a flow diagram showing example steps that may be taken by a factory to return a requested object instance, whether by creation or by accessing a cache incorporated into or coupled to the factory, according to one or more example implementations.

FIG. 10 is a flow diagram containing example steps that summarize the general operation of a factory that has a cache, beginning at step 1002 where a request for an object is received. As is understood, the request includes a factoryId, as well as any other needed (or optional) creation parameters.

Step 1006 represents checking the cache for the object. If so, the object is retrieved from the cache at step 1008 and returned to the caller at step 1022, e.g., as a copy of the previously cached instance.

If not cached (or possibly still in the cache but expired), steps 1010, 1012, 1014 and 1016 are similar to those described above with reference to FIG. 9 (steps 910, 912, 914 and 916) to map the factory ID to an object, use any construction parameters, create an instance of the object and tag the instance with the factory ID and any other data corresponding to any construction parameter set, respectively.

Step 1018 is an optional step that may be used by a factory that does not cache all of its objects. For example, a factory on a given platform may not cache objects above a certain size, or use basically any other criterion or criteria to make such a determination (some view objects may be read only, for example, and thus may be cached, while others may require new individual instances). Note that step 1018 is shown is dashed, as it may be simply omitted for a given factory that caches every object (step 1016 can go to step 1020). In any event, if the object is to be cached, step 1020 caches the instance, and step 1022 returns the instance.

Note that as part of caching an object, expiry information may be associated with the object, and caching may evict another object (or objects) based upon a retention policy. Further, if at step 1006 an object was in the cache but expired, a subsequent step (not shown) may evict the expired object and continue to step 1010. Still further, a cache manager may be run regularly or occasionally to evict expired objects and/or perform other cache maintenance duties.

As can be seen, the technology described herein uses a variation of the traditional factory pattern for the creation of many of its objects. Factories are configured by configuration scripts. This ties classes to Factory IDs, rather than interfaces.

The factoryId system thus maintains an abstraction between the code that requests an object and the specific implementation that it will get. To this end, the use of factoryIds creates a common language between the factory and the code that will use the object, which is separate from the specific classes to use but may map to them. FactoryIds can be many-to-one and one-to-many with respect to specific implementations. FactoryIds are configured at startup, so the factory code does not need to depend on the code of the objects it will end up creating.

In one or more implementations, objects are tagged with enough information to recreate them, which is useful for simulating serialization/de-serialization without necessarily saving the entire object's data. Objects may be cached to reuse objects when appropriate.

One or more aspects are directed towards receiving a request including a factory ID at a factory object, and using the factory ID to differentiate among different objects that are returnable. An instance of the object may be created based upon the factory ID, returned in response to the request. This may include running a configuration script, which may be a platform-dependent configuration script.

The object may be cached, whereby upon receiving another request including the factory ID at the factory object, a copy of the object may be accessed from the cache and returned in response to the other request. The object instance may be tagged with data corresponding to the factory ID. The object instance may be tagged with other data corresponding to a construction parameter set, e.g., including an object ID.

The request thus may be associated with an object ID, which is useable to differentiate among different types of objects that are returnable. The object instance may be tagged with data corresponding to the factory ID and other data corresponding to the object ID. The factory ID and object ID may be preserved as information associated with the object instance, and used to subsequently recreate or obtain an instance of the object.

As one example, the factory may comprise a view factory and the object instance may comprise a view. The factory ID and/or the object ID may be used to obtain style information for the view.

One or more aspects are directed towards a factory object that returns an object instance in response to a request. The factory object is configured to use a factory ID associated with the request to determine a selected object to return from among a plurality of returnable objects, and to return an instance of the selected object in response to the request.

The factory object may, for example, comprise a location factory, a view host factory, a view factory, a view model factory or a data model factory. If the factory object comprises a location factory that returns the object instance, the location factory may call at least one other factory to obtain information for the object instance.

The factory object may tag the selected object instance with the factory ID. The factory object may use an object ID associated with the request for the object to determine a selected object type that corresponds to the factory ID, to return the selected object instance from among the plurality of returnable objects. The factory object may tag the selected object instance with the factory ID and the object ID.

The factory object may incorporate or be coupled to a cache, and the factory object may return the selected object instance from the cache based upon the factory ID and/or the object ID. If the factory object incorporates or is coupled to a cache, the factory object may create and cache the selected object instance into the cache.

One or more aspects are directed towards receiving a request for a location, in which the location corresponds to a view and is identified by a factory ID and an object ID. A view factory is called to return a view object corresponding to the view, including providing the factory ID and object ID to the view factory. Also described is calling a model factory to return data needed by the view object, and returning the view object in response to the request for the location.

The request for the location may be received at a location factory that creates a location object that calls the view factory, or calls a view host factory that calls the view factory. The location object may call the model factory, or call another factory that calls the model factory.

A visible representation of the view object may be rendered, in which the view object comprises a menu that corresponds to the factory ID and the view object is a type of menu that corresponds to the object ID.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
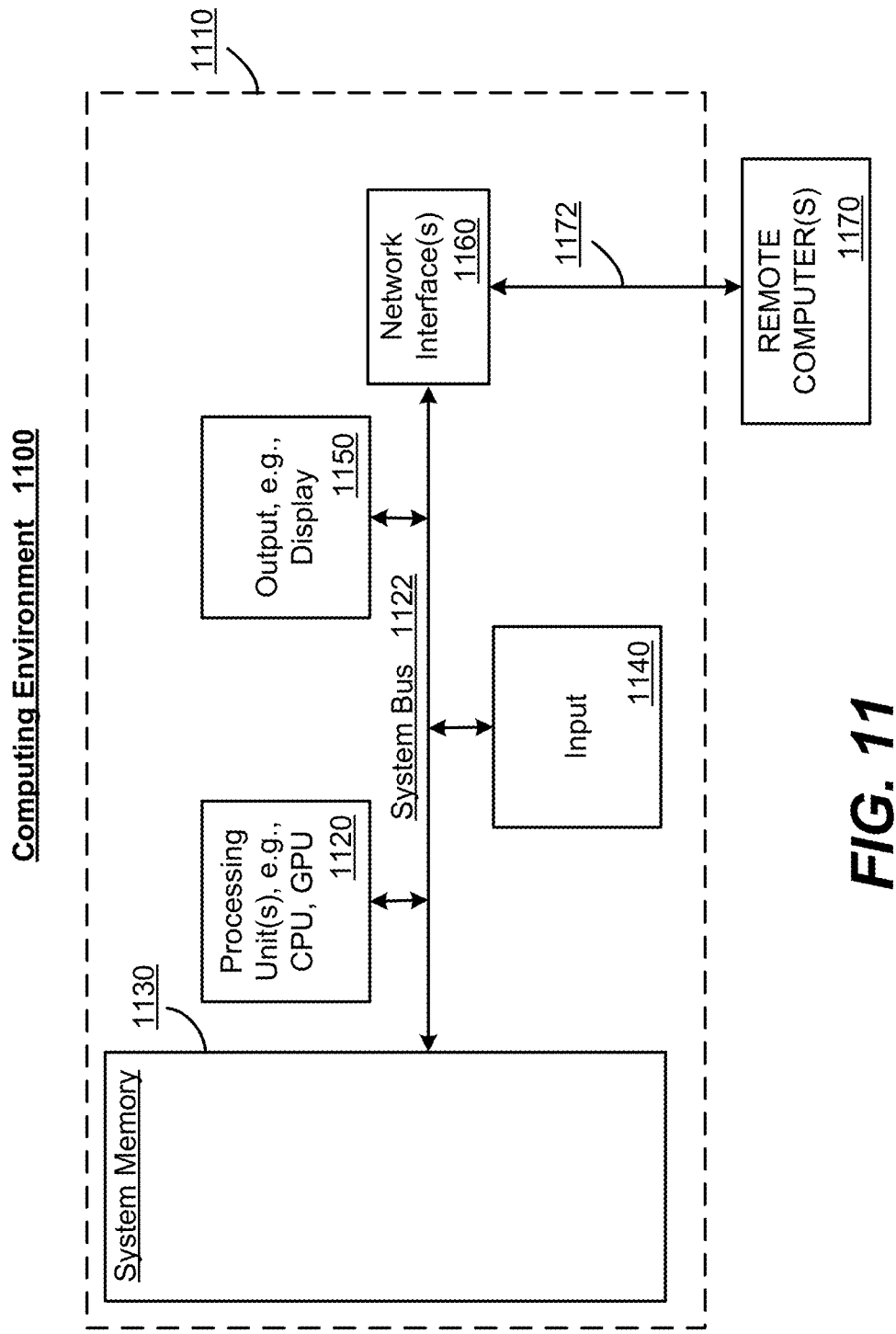
FIG. 11 is a block diagram representing an example computing environment into which aspects of the subject matter described herein may be incorporated.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine/computer-readable media and can be any available media that can be accessed by computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method, comprising:
generating, by a processor, a mapping between factory identifiers and object classes associated with a user interface;
receiving, by the processor, a request including a factory identifier and a flag indicating whether to create a new instance rather than use a cached object;
using, by the processor, the mapping to identify an object class associated with the factory identifier;
tagging, by the processor, the instance of the object with the factory identifier;
tagging, by the processor, the instance of the object with other data corresponding to a construction parameter set;
in response to determining that the flag does not indicate to create the new instance rather than use the cached object, retrieving, by the processor via a factory associated with the factory identifier, an instance of an object of the object class from a cache;
in response to determining that the flag indicates to create the new instance rather than use the cached, creating, by the processor via the factory associated with the factory identifier, the instance of the object of the object class; and
returning, by the processor, the instance of the object in response to the request.

2. The method of claim 1, further comprising:
caching, by the processor, the instance of the object;
receiving, by the processor, another request including the factory identifier;
accessing, by the processor, the instance of the object from the cache; and
returning the instance of the object in response to the other request.

3. The method of claim 1, wherein the receiving the request further comprises receiving an object identifier, and further comprising using, by the processor via the factory, the object identifier to select the object from a plurality of objects of the object class.

4. The method of claim 3, wherein the factory comprises a view factory and the instance of the object comprises a view, and further comprising, using, by the processor, at least one of the factory identifier or the object identifier to obtain style information for the view.

5. The method of claim 3, further comprising, tagging the instance of the object with the factory identifier and the object identifier.

6. The method of claim 5, further comprising:
preserving, by the processor, the factory identifier and object identifier as preserved information associated with the object instance; and
using, by the processor, the preserved information to subsequently recreate or obtain the instance of the object.

7. The method of claim 1, wherein creating the instance of the object based upon the factory identifier includes:
determining, by the processor, a platform, associated with the request, on which the instance of the object is to run;
selecting, by the processor from a plurality of platform-dependent configuration scripts respectively associated distinct platforms, a platform-dependent configuration script associated with the platform; and
running the platform-dependent configuration script.

8. A system, comprising:
a processor, communicatively coupled to a memory that stores computer-executable instructions, that executes the instructions to perform operations, the operations comprising:
generate a mapping between factory identifiers and object classes associated with a user interface;
receive a request including a factory identifier and a flag indicating whether to create a new instance rather than use a cached object;
employ the mapping to identify an object class associated with the factory identifier;
in response to a determination that the flag does not indicate to create the new instance rather than use the cached object, retrieve, via a factory associated with the factory identifier, an instance of an object of the object class from a cache;
in response to a determination that the flag indicates to create the new instance rather than use the cached object, create, via the factory associated with the factory identifier, the instance of the object of the object class;

wherein the factory tags the instance of the object with the factory identifier and with other data corresponding to a construction parameter set; and return the instance of the object in response to the request.

9. The system of claim 8, wherein the factory comprises a location factory, a view host factory, a view factory, a view model factory or a data model factory.

10. The system of claim 8, wherein the factory comprises a location factory that returns the instance of the object, and wherein the location factory calls at least one other factory to obtain information for the instance of the object.

11. The system of claim 8, wherein the factory uses an object identifier included in the request to determine the object from among a plurality of objects of the object class.

12. The system of claim 11, wherein the factory incorporates or is coupled to a cache, and wherein the factory returns the instance of the object from the cache based upon at least one of the factory identifier or the object identifier.

13. The system of claim 11, wherein the factory incorporates or is coupled to a cache, and wherein the factory caches the instance of the object into the cache.

14. The system of claim 11, wherein the factory tags the instance of the object with the factory identifier and the object identifier.

15. A non-transitory computer-readable medium having instructions stored thereon that, in response to execution, cause a processor to perform operations comprising:

generating a mapping between factory identifiers and object classes associated with a user interface;

receiving a request including a factory identifier, an object identifier and a flag indicating whether to create a new instance rather than use a cached object;

employing the mapping to identify an object class associated with the factory identifier;

in response to determining that the flag does not indicate to create the new instance rather than use the cached object, retrieving, via a factory associated with the factory identifier, an instance of an object of the object class from a cache;

using, by the processor via the factory, the object identifier to select the object from a plurality of objects of the object class;

tagging the instance of the object with the factory identifier and the object identifier;

preserving the factory identifier and object identifier as preserved information associated with the object instance and using the preserved information to subsequently recreate or obtain the instance of the object;

in response to determining that the flag indicates to create the new instance rather than use the cached object, generating, by the factory, the instance of the object of the object class; and returning the instance of the object in response to the request.

16. The non-transitory computer-readable medium of claim 15, wherein the request include an object identifier, and the generating the instance of the object includes selecting the object from a plurality of objects of the object class based on the object identifier.

17. The non-transitory computer-readable medium of claim 16, further comprising, rendering a visible representation of the object, in which the object comprises a menu that corresponds to the factory identifier and the object is a type of menu that corresponds to the object identifier.

* * * * *